United States Patent [19]
Sugita

[11] Patent Number: 5,748,984
[45] Date of Patent: May 5, 1998

[54] AD CONVERTING APPARATUS INCLUDING HOLDING MEANS INDICATING WHETHER OR NOT DATA AFTER AD CONVERSION HAS BEEN PREVIOUSLY USED

[75] Inventor: Mitsuru Sugita, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 447,588

[22] Filed: May 23, 1995

[30] Foreign Application Priority Data

Sep. 5, 1994 [JP] Japan .................. 6-221250

[51] Int. Cl.⁶ .................. G06F 11/00; H03M 1/38
[52] U.S. Cl. .................. 395/889; 395/890; 395/891; 395/892
[58] Field of Search .................. 395/889, 890, 395/891, 892

[56] References Cited

U.S. PATENT DOCUMENTS

| | | | |
|---|---|---|---|
| 4,646,261 | 2/1987 | Ng | 364/900 |
| 4,954,988 | 9/1990 | Robb | 365/189.02 |
| 5,087,915 | 2/1992 | Toya | 341/155 |
| 5,229,770 | 7/1993 | Nakajima | 341/161 |
| 5,327,551 | 7/1994 | Kaneko | 395/575 |
| 5,349,351 | 9/1994 | Obara et al. | 341/141 |
| 5,404,484 | 4/1995 | Schlansker et al. | 395/425 |
| 5,438,575 | 8/1995 | Bertrand | 371/48 |
| 5,544,329 | 8/1996 | Engel et al. | 395/826 |
| 5,544,345 | 8/1996 | Carpenter et al. | 395/477 |
| 5,577,229 | 11/1996 | Wakerly | 395/474 |

FOREIGN PATENT DOCUMENTS

4200882 A1  7/1992  Germany.
4416170 A1  1/1995  Germany.

Primary Examiner—Thoams C. Lee
Assistant Examiner—Rehana Perveen
Attorney, Agent, or Firm—McDermott, Will & Emery

[57] ABSTRACT

An AD converting apparatus which is provided with a data update flag 3b for storing a first value ("1") when an analog signal is newly converted by an AD converter 1 to digital data and is stored into a data register 3a, and for storing a second value ("0") when the contents of the data register 3a are read out externally in a state under which the first value has been stored, and which eliminates a wasteful operation such that the data having already been used is used again to perform an arithmetic operation, by building in a hardware capable of indicating whether the data after AD conversion has already been used once or not, and thus improving processing speed as a whole; and a data processor in which the AD converting apparatus is built in.

19 Claims, 15 Drawing Sheets

AD CONVERTING APPARATUS INCLUDING HOLDING MEANS INDICATING WHETHER OR NOT DATA AFTER AD CONVERSION HAS BEEN PREVIOUSLY USED

FIELD OF THE INVENTION

The present invention relates to an AD converting apparatus and a data processor building in the AD converting apparatus, and more specifically, to an AD converting apparatus for allowing an arithmetic unit to utilize efficiently conversion result by an AD converter and a data processor in which the AD converting apparatus is built in.

DESCRIPTION OF THE RELATED ART

In the case where a processing utilizing conversion results by an AD converter is executed during program execution in an arithmetic unit, heretofore, the arithmetic unit reads necessary AD conversion results, executes an arithmetic processing based on the read-out conversion results, and reflects processed results on the operation thereof.

Heretofore, a technique has been employed in which an arithmetic unit activates an AD converter when AD conversion results become necessary, and AD the conversion results are utilized after the completion of the AD conversion has been indicated by a program or an interrupt processing. However, recently, the AD converter itself is highly improved in function by including, for example, a function called a scan mode or the like, so that a configuration in which latest AD conversion results are stored in a predetermined register at all times leads the market. Therefore, AD conversion results stored in the register are read out when the results become necessary, thereby allowing an arithmetic unit to perform an arithmetic operation by the use of latest data.

Now, in such a case as described above, in the case where even latest data is stored in the register at all times, when the data is the one once used, it is wasteful for a data processor that the data is used to perform an arithmetic operation again, which becomes a cause of reduced processing speed of the data processor as a whole.

SUMMARY OF THE INVENTION

The present invention has been devised in view of such circumstances, and it is an object thereof to provide an AD converting apparatus which builds in a hardware capable of indicating whether or not data after AD conversion has already been used once, thereby eliminating such a wasteful operation that data having already been used is used again to perform an arithmetic operation and thus improving processing speed as a whole, and a data processor in which the AD converting apparatus is built in.

The AD converting apparatus and the data processor in which the AD converting is built in related to the present invention is provided with a data update flag (holding means) for holding a first value in the case where an analog signal is newly converted by an AD converter to digital data and is stored into a data register (data storing means), and for holding a second value in the case where contents of the data storing means are read out externally in a state under which the first value has been stored.

In the AD converting apparatus and the data processor in which the AD converting apparatus is built in related to the present invention, the value of the data update flag indicates whether or not the data stored in the data registers has been used.

Also, the AD converting apparatus and the data processor in which the AD converting apparatus is built in related to the present invention is provided with at least a plurality of data registers, and data update flags in correspondence with respective registers.

Also, in the AD converting apparatus and the data processor in which the AD converting apparatus is built in related to the present invention, digital data obtained by AD converting the analog signals of plural channels can be stored into respective plural data registers.

Also, the AD converting apparatus and the data processor in which the AD converting apparatus is built in related to the present invention is provided with a register in which the data register and the data update flag are configured as one register.

Also, in the AD converting apparatus and the data processor in which the AD converting apparatus is built in related to the present invention, the data register and the data update flag are configured as one register, so that they can be accessed with one operation.

Also, the AD converting apparatus and the data processor in which the AD converting apparatus is built in related to the present invention is provided with means for simultaneously reading out values stored in a plurality of the data update flags as a parallel signal.

Also, in the AD converting apparatus and the data processor in which the AD converting apparatus is built in related to the present invention, only the values stored in a plurality of the data update flags can be read at first.

Also, the AD converting apparatus and the data processor in which the AD converting apparatus is built in related to the present invention is provided with means for outputting logical sum signals of the values stored in a plurality of the data update flags, and gives it as an interrupt request signal to a CPU.

Also, in the AD converting apparatus and the data processor in which the AD converting apparatus is built in related to the present invention, the value of logical sum signals indicates whether any of data of AD conversion result has been used, or whether every data has not been used.

Also, in the AD converting apparatus and the data processor in which the AD converting apparatus is built in related to the present invention, the data update flags are configured as a shift register for performing shift operation when an analog signal is newly converted by the AD converter to digital data and is stored into the data register.

Also, in the AD converting apparatus and the data processor in which the AD converting apparatus is built in related to the present invention, the usage history of the data obtained as a result of plural AD conversions is indicated.

The above and further objects and features of the invention will more fully be apparent from the following detailed description with accompanying drawings.

DESCRIPTION OF THE PREFERRED EMBODIMENTS

Figure 1:
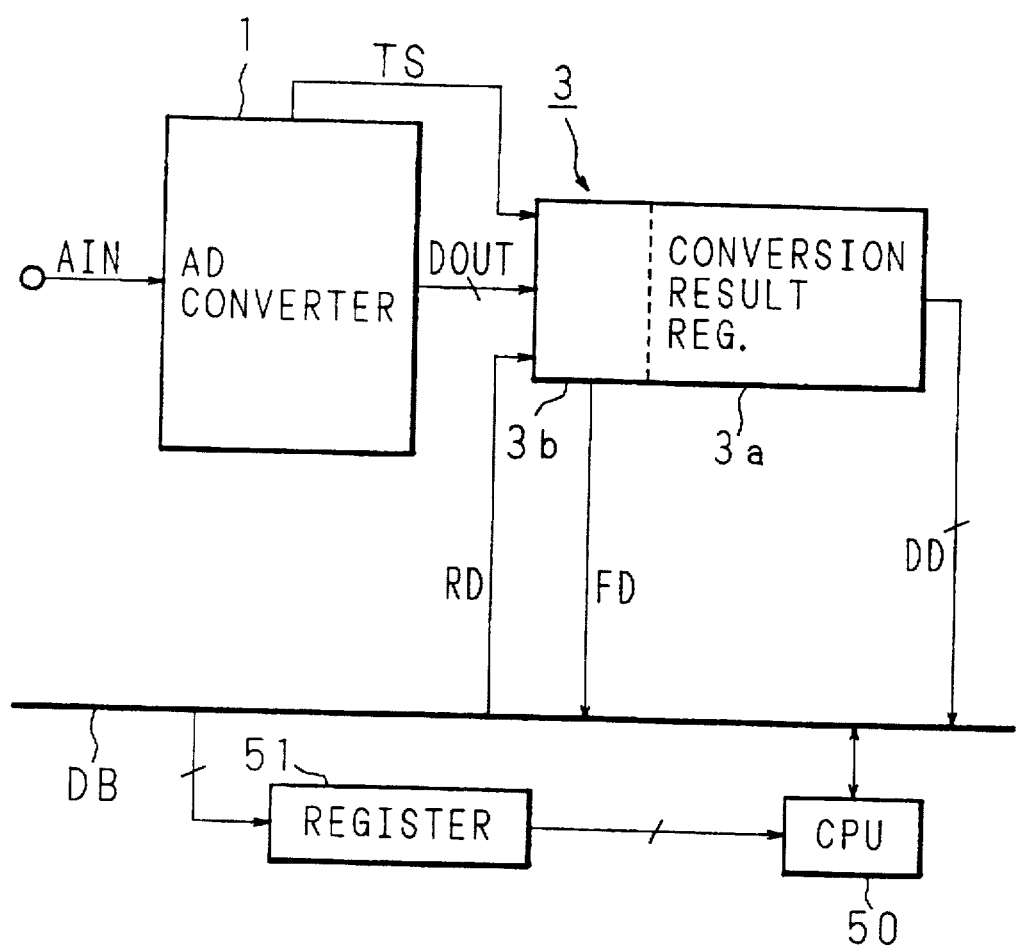
FIG. 1 is a block diagram showing a configuration of a first embodiment of an AD converting apparatus and a data processor in which the AD converting apparatus is built in related to the present invention.

The present invention will be explained in detail hereinafter referring to the drawings showing embodiments thereof.

[First embodiment]

FIG. 1 is a block diagram showing a first embodiment of an AD converting apparatus and the data processor in which the AD converting apparatus is built in related to the present invention.

In FIG. 1, reference numeral 1 designates an AD converter. The AD converter 1 itself has a well-known general configuration. An analog input signal AIN is inputted into the AD converter 1, and a digital output signal DOUT after being AD converted is outputted therefrom.

Reference numeral 3 designates a conversion result register. The conversion result register 3 is composed of a set of a data register 3a and a data update flag 3b having a semaphore-like function. Stored in the data register 3a is the digital output signal DOUT which is an output signal of the above-mentioned AD converter 1.

In addition, in FIG. 1, reference numeral 50 designates a CPU of the data processor. The CPU 50 is connected through a data bus DB with the conversion result register 3. Reference character TS designates a conversion result transfer signal outputted from the AD converter 1 when AD conversion is completed; RD designates a read signal which is used by the CPU 50 for reading out a digital data of the AD conversion result from the conversion result register 3; FD designates a value of the data update flag 3b outputted from the conversion result register 3; DD designates a digital data outputted from the data update flag 3b; and 51 designates a register for temporarily holding the digital data of the AD conversion result having been read out from the conversion result register 3 to the data bus DB.

Figure 2:
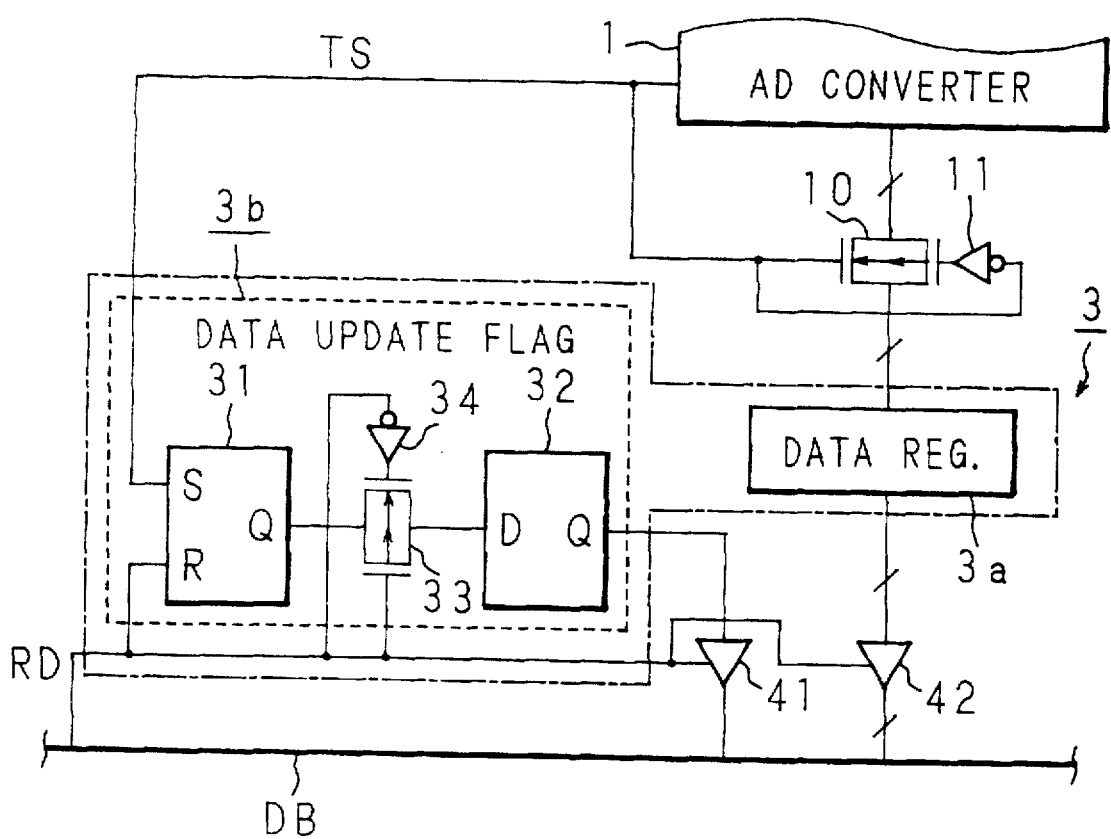
FIG. 2 is a circuit diagram showing a configuration example of a conversion result register of the first embodiment.

FIG. 2 is a circuit diagram showing a configuration example of the conversion result register 3 of the first embodiment. The register 3 is composed of the data register 3a and the data update flag 3b. The data register 3a is composed mainly of a set/reset flip-flop (hereinafter called SR flip-flop) 31, a data latch 32, a transfer gate 33 and an inverter 34.

Given to a set terminal S of the SR flip-flop 31 is the conversion result transfer signal TS outputted from the AD converter 1, and given to a reset terminal R of the same is the read signal RD outputted from the CPU 50.

Reference numeral 32 designates a data latch, whose input terminal D is connected through the transfer gate 33 with an output terminal Q of the SR flip-flop 31. An output terminal Q of the data latch 32 is connected through a tristate buffer 41 with the data bus DB. As a signal for on/off controlling of the transfer gate 33, the read signal RD is given directly and through the inverter 34 to the transfer gate 33. The transfer gate 33 turns off when the read signal RD is high level, and turns on when the read signal RD is low level. On/off control of the tristate buffer 41 is also performed by the read signal RD such that it turns on when the read signal RD is high level and off when low level.

In FIG. 2, reference numeral 10 designates a transfer gate disposed between an output of the AD converter 1 and the data register 3a, and as a signal for on/off controlling thereof, the conversion result transfer signal TS is given directly and through an inverter 11 thereto. The transfer gate 10 turns on when the conversion result transfer signal TS is high level and off when low level. The reference numeral 42 designates a tristate buffer disposed between the data register 3a and the data bus DB. The tristate buffer 42 is on/off controlled by the read signal RD in a similar manner to the above-mentioned tristate buffer 41.

Both the digital output signal from the AD converter 1 through the transfer gate 10 to the data register 3a and the digital data DD outputted from the data register 3a through the tristate buffer 42 to the data bus DB are in fact plural-bit parallel signals, so that there are provided the same number of the transfer gates 10 and the tristate buffers 42 as that of the bits of the digital data.

Figure 3:
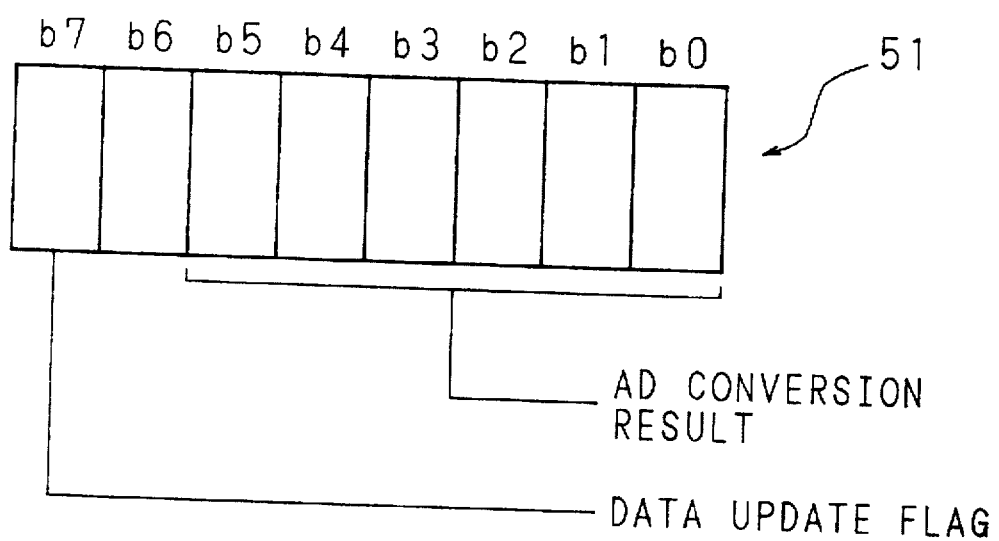
FIG. 3 is a schematic diagram showing a bit configuration example of the register of the first embodiment.

FIG. 3 is a schematic diagram showing a bit configuration example of the register 51. The register 51 in this embodiment is an eight-bit register composed of bit b0 through bit b7, six bits from bit b0 through bit b5 holding the digital data DD of the AD conversion result outputted from the data register 3a, while the bit b7 holding the value FD of the data update flag 3b.

The operation of the first embodiment of such AD converting apparatus and the data processor in which the AD converting apparatus is built in related to the present invention will be explained hereinafter with reference to FIG. 1 and FIG. 2.

When the CPU 50 does not read out data, the read signal RD is kept at a low level. This causes the transfer gate 33 to be in on state.

Now, the analog signal input AIN is assumed to be converted by the AD converter 1 to a digital signal, the conversion result transfer signal TS outputted from the AD converter 1 becomes in high level. This causes the transfer gate 10 to turn on and thus the digital output signal DOUT to be stored into the data register 3a. At this time, because the conversion result transfer signal TS of high level is also given to the set terminal S of the SR flip-flop 31 of the data update flag 3b, the SR flip-flop 31 is set to cause the output signal from the output terminal Q thereof to become in high level. In this time point, the transfer gate 33 is in on state, so that the output signal of high level from the output terminal Q of the SR flip-flop 31 is latched by the data latch 32. Therefore, the output signal from the output terminal Q of the data latch 32 becomes in high level ("1").

Under such a state, in the case where the CPU 50 reads out the digital data stored in the data register 3a, the CPU 50 outputs the read signal RD. This causes the tristate buffers 41 and 42 to become on state, so that the signal "1" outputted from the data latch 32 and the digital data DD stored in the data register 3a are stored through the data bus DB into the register 51.

At this time, the read signal RD is given to the reset terminal R of the SR flip-flop 31 and to the transfer gate 33, so that the SR flip-flop 31 becomes in a reset state to cause the output signal from the output terminal Q thereof to become low level, while the transfer gate 33 becomes in an off state to cause the output signal from the output terminal Q of the data latch 32 to be kept at "1". Thereafter, when the CPU 50 makes the read signal RD be in low level, the transfer gate 33 becomes in an on state to cause the output signal of low level from the output terminal Q of SR flip-flop 31 to be latched by the data latch 32.

Therefore, when the CPU 50 reads out the digital data DD as the AD conversion result from the conversion result register 3, the value of the data update flag 3b, specifically, the value of the output signal of the data latch 32 becomes "0". Then, under that state, the AD converter 1 newly performs AD conversion and stores a digital data of the result in the data register 3a to cause the value of the data update flag 3b to become "1".

In the case where the CPU 50 must use the digital date DD held in the data register 3a to perform processing, at first the read signal RD is made to be in high level to cause the value held in the data latch 32 of the data update flag 3b and the digital data DD held in the data register 3a to be stored through the data bus DB into the register 51. Then, when the CPU 50 reads out the value of bit b7 of the register 51, that is, the value of the output signal of the data latch 32 of the data update flag 3b, and only when the read-out value is "1", the CPU 50 reads the digital data DD stored in other bit b0 through bit b5 to perform data processing, thereby a wasteful operation that the same data is repeatedly processed will be avoided.

[Second embodiment]

Figure 4:
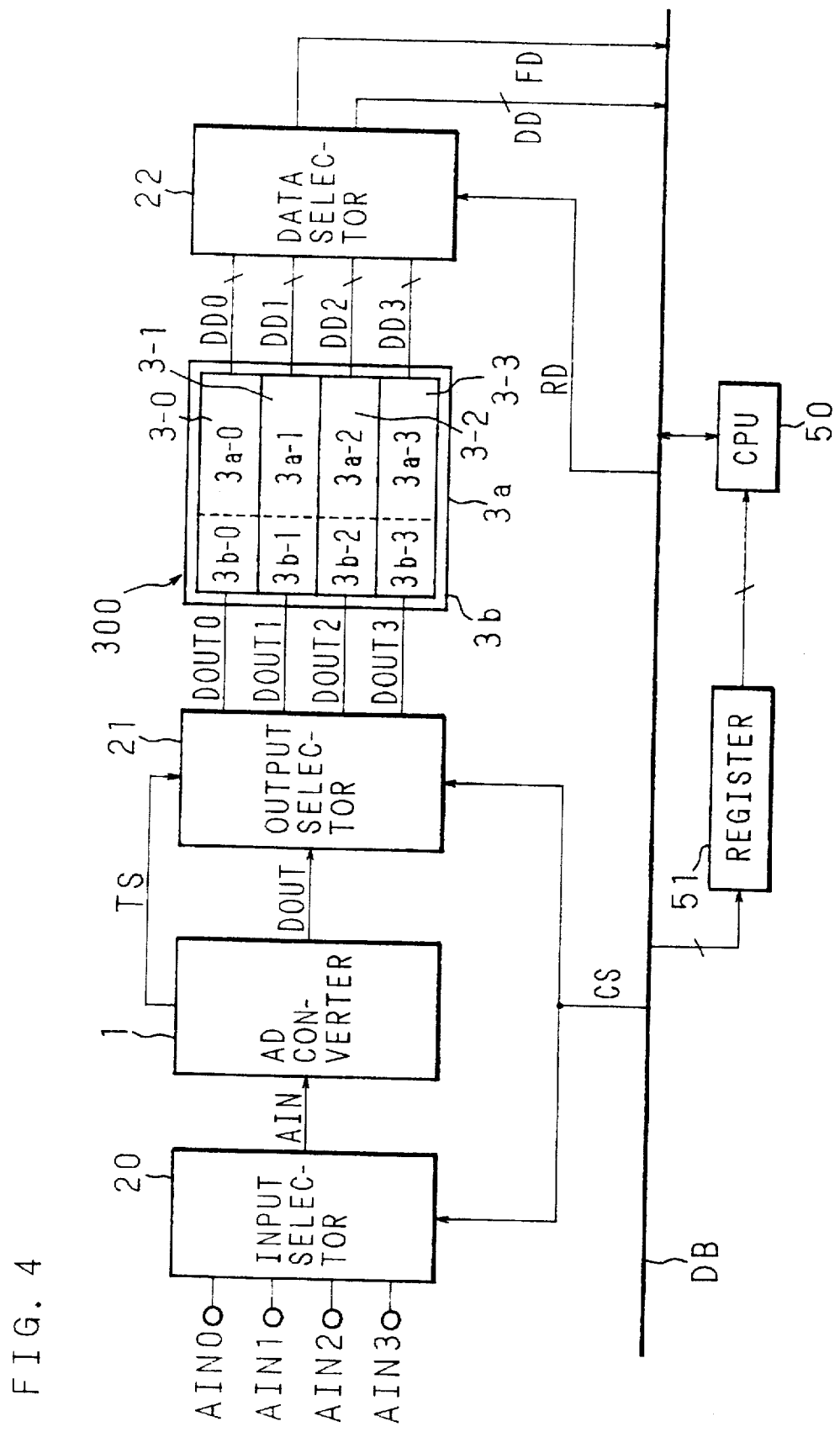
FIG. 4 is a block diagram showing a configuration example of a second embodiment of the AD converting apparatus and the data processor in which the AD converting apparatus is built in related to the present invention.

A second embodiment of the AD converting apparatus and the data processor in which the AD converting apparatus is built in related to the present invention will be explained hereinafter with reference to the block diagram of FIG. 4 showing a configuration example thereof. The second embodiment is an example in which both the input to and the output from the AD converter 1 are connected through plural channels, specifically, four channels.

In FIG. 4, reference numeral 1 designates an AD converter; 20 designates an input selector for selecting the analog input signal to the AD converter 1; and 21 designates an output selector for outputting selectively conversion results by the AD converter 1 to any of respective conversion result registers 3-0, 3-1 . . . of a conversion result register group 300 described later. In this embodiment, there are provided four conversion result registers 3 shown with reference numerals 3-0, 3-1, 3-2 and 3-3 being matched to the number of channels and they are collectively called the conversion result register group 300.

The four conversion result registers 3 themselves in the conversion result register group 300 are composed of the data registers 3a and the data update flags 3b in the same way as the conversion result register 3 of the above-mentioned first embodiment. In correspondence with respective conversion result registers 3-0, 3-1, 3-2 and 3-3, respective data registers are shown with reference characters 3a-0, 3a-1, 3a-2 and 3a-3, and respective data update flags shown with 3b-0, 3b-1, 3b-2 and 3b-3.

Reference numeral 22 designates a data selector for selecting one of digital data DD0, DD1, DD2 and DD3 from respective four conversion result registers 3-0, 3-1, 3-2 and 3-3 among the conversion result register group 300 and outputting it as the digital data DD, and the detail will be described later.

In the second embodiment shown in FIG. 4, inputted to the input selector 20 are four-channel analog signals AIN0, AIN1, AIN2, AIN3, and any one of which is selected by the input selector 20 and inputted to the AD converter 1.

Figure 5:
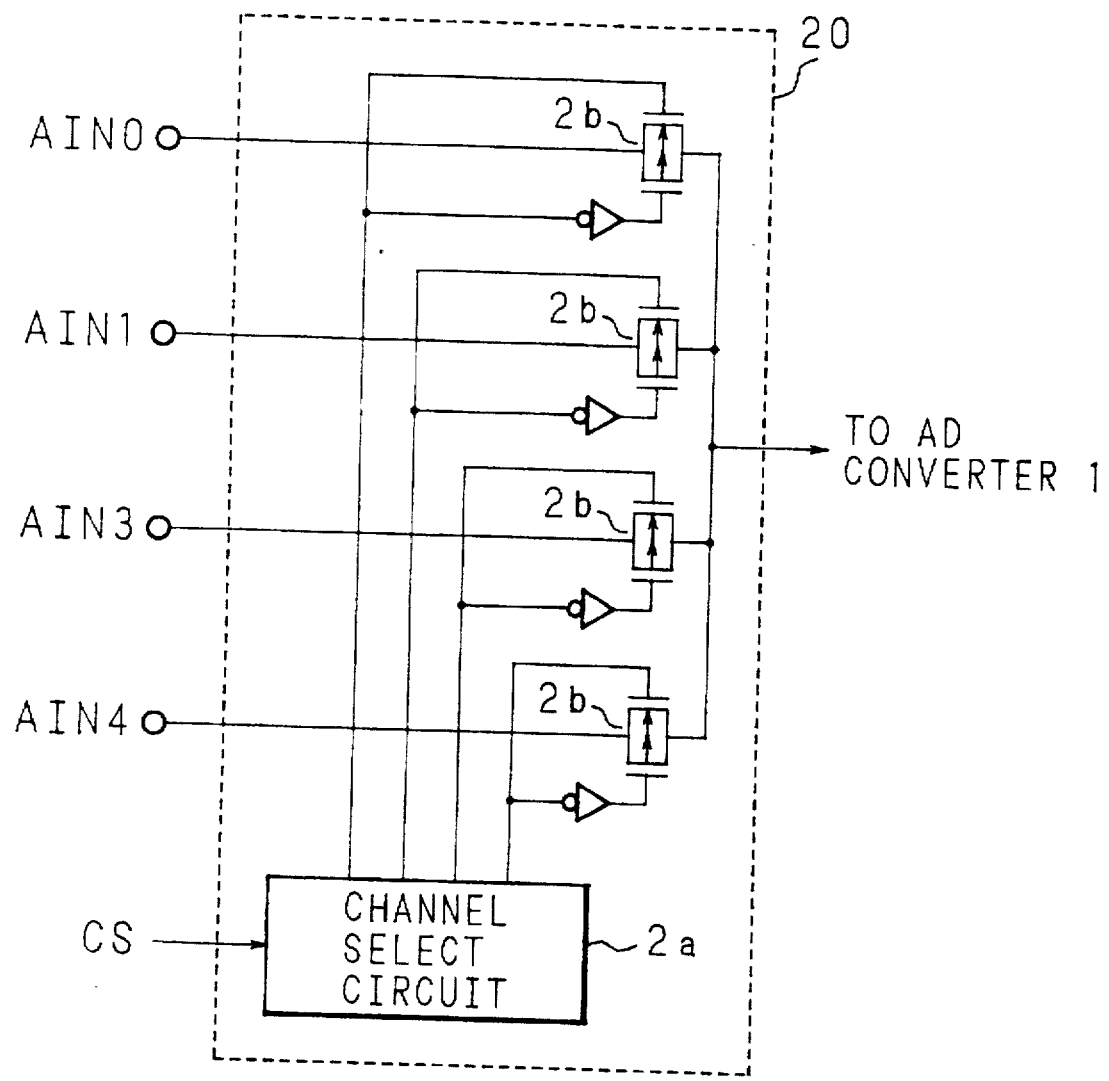
FIG. 5 is a circuit diagram showing one example of a circuit configuration of an input selector of the second embodiment.

FIG. 5 is a circuit diagram showing one example of a circuit configuration of the input selector 20, and the circuit itself is a well-known art. In FIG. 5, reference numeral 2a designates a channel select circuit which decodes a channel select signal CS given from the CPU 50 and makes any one of four outputs be significant (high level). Reference numeral 2b designates transfer gates connected to respective four-channel analog input signals AIN0, AIN1, AIN2 and AIN3, and the gates are on/off controlled by the respective four outputs of the above-mentioned channel select circuit 2a. Input of each transfer gate 2b is an input signal of each channel, and output of the same is connected to the input of the AD converter 1.

Therefore, when the CPU 50 outputs the channel select signal CS specifying the analog signal AIN0 of the first channel, for example, the output signal from the channel select circuit 2a corresponding to the channel select signal CS becomes significant to cause the transfer gate 2b to which the analog input signal AIN0 is inputted to become on state, thereby the analog input signal AIN0 is outputted from the input selector 20 and inputted into the AD converter 1.

As described previously, the respective conversion result registers 3-0, 3-1, 3-2 and 3-3 of the conversion result register group 300 are provided in such a manner that the data registers 3a and the data update flags 3b are combined corresponding to the respective channels. Stored in the respective data registers 3a-0, 3a-1, 3a-2 and 3a-3 are respective DOUT0, DOUT1, DQUT2 and DOUT3 which are the output signals of the output selector 21.

Figure 6:
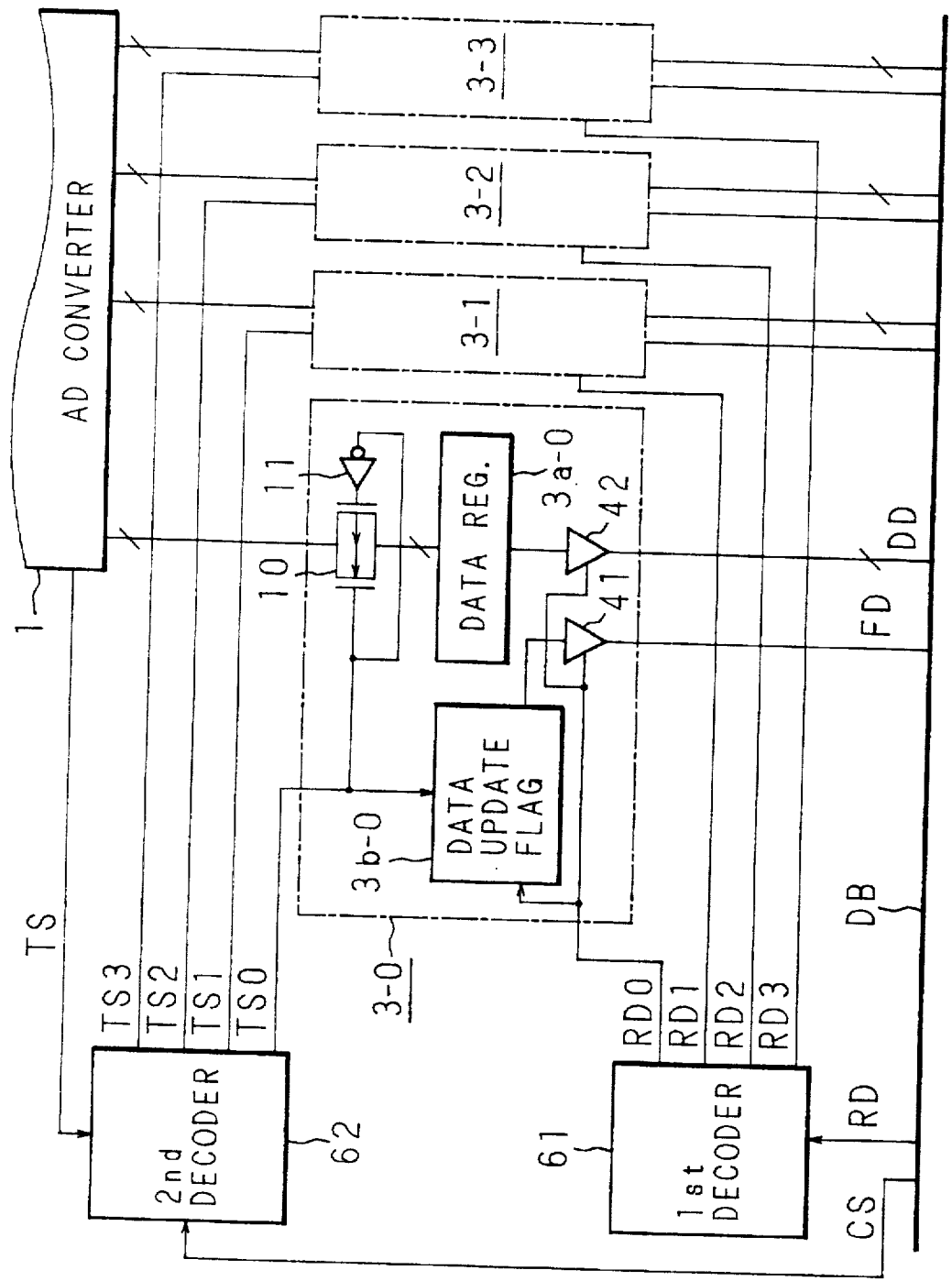
FIG. 6 is a circuit diagram showing a configuration example of a conversion result register group, an output selector and a data selector of the second embodiment.

FIG. 6 is a circuit diagram showing a configuration example of the conversion result register group 300, the output selector 21 and the data selector 22 of this second embodiment. The configuration itself of each of the conversion result registers 3-0, 3-1, 3-2 and 3-3 is not different basically from that of the above-mentioned first embodiment, and each register is composed of data register 3a, data update flag 3b, transfer gate 10, inverter 11 and tristate buffers 41 and 42. The internal configuration of each of the data update flags 3b-0, 3b-1, 3b-2 and 3b-3 is also guide the same as that of the data update flag 3b of the first embodiment shown in FIG. 2.

Reference numeral 61 designates a first decoder for decoding the read signal RD which is outputted from the CPU in order to specify read-out data from any one of the conversion result registers 3. Specifically, by decoding two-bit read signal RD outputted from the CPU 50 by the first decoder 61, a first decoder 61 makes be high level only any one of read signals RD0, RD1, RD2 and RD3 corresponding to the respective four conversion result registers 3-0, 3-1, 3-2 and 3-3.

As mentioned above, respective read signals RD0, RD1, RD2 and RD3 outputted from the first decoder 61 are given to the respective conversion result registers 3-0, 3-1, 3-2 and 3-3, and, in each of the conversion result registers 3-0, 3-1, 3-2 and 3-3, function in quite the same manner as that of the read signal RD shown in FIG. 2.

The data selector 22 shown in FIG. 4 is composed of the first decoder 61, and the tristate buffers 41 and 42 in the conversion result registers 3-0, 3-1, 3-2 and 3-3.

The reference numeral 62 designates a second decoder for decoding the channel select signal CS outputted from the CPU in order to specify any one of AD conversion results by the AD converter 1 to be stored in the conversion result register 3. Specifically, when the conversion result transfer signal TS outputted from the AD converter 1 is high level, by decoding the two-bit channel select signal CS outputted from the CPU 50 by the second decoder 62, the second decoder 62 makes be high level only any one of conversion result transfer signals TS0, TS1, TS2 and TS3 corresponding to the respective four conversion result registers 3-0, 3-1, 3-2 and 3-3.

As mentioned above, the respective conversion result transfer signals TS0, TS1, TS2 and TS3 outputted from the second decoder 62 are given to the respective conversion result registers 3-0, 3-1, 3-2 and 3-3, and, in each of conversion result registers 3-0, 3-1, 3-2 and 3-3, function in quite the same manner as that of conversion result transfer signal TS shown in FIG. 2.

The output selector 21 shown in FIG. 4 is composed of the second decoder 62, and the transfer gate 10 and the inverter 11 in the conversion result registers 3-0, 3-1, 3-2 and 3-3.

The operation of the second embodiment of such AD converting apparatus and the data processor in which the AD converting apparatus is built in related to the present invention will be explained hereinafter.

At first, when the CPU 50 does not read out data, the read signal RD is kept at low level. In the same way as the first embodiment, this causes the transfer gate 33 in the data update flag 3b of each of the conversion result registers 3-0, 3-1, 3-2 and 3-3 to be in on state.

Now, when, for example, AIN0 as the first channel of the four-channel analog signal inputs is converted to a digital signal, the CPU 50 outputs the channel select signal CS specifying the analog input signal AIN0. The channel select signal CS is given to the input selector 20, thereby the analog input signal AIN0 is selected, and converted by the AD converter 1 to a digital signal and outputted to the output selector 21. At this time, the conversion result transfer signal TS is outputted from the AD converter 1 and given to the second decoder 62.

In this case, the channel select signal CS outputted from the CPU 50 selects the first channel, so that the second decoder 62 makes be high level only the conversion result transfer signal TS0 which is given to the conversion result register 3-0 corresponding to the first channel. This causes the transfer gate 10 in the conversion result register 3-0 to turn on and thus the digital signal after AD conversion to be held in the data register 3a-0. At this time, the conversion result transfer signal TS0 of high level is also given to the data update flag 3b-0 of the conversion result register 3-0, so that in the same way as the first embodiment, the value of the output signal of the data update flag 3b-0 becomes "1".

Then, when, for example, the CPU 50 reads out digital data stored in the data register 3a-0 of the conversion result register 3-0 of the first channel, the read signal RD specifying the first channel is outputted from the CPU 50. The read signal RD is given to the first decoder 61, thereby the first decoder 61 makes be high level only the read signal RD0 which is given to the conversion result register 3-0 corresponding to the first channel. This causes the tristate buffer 42 in the conversion result register 3-0 to turn on and thus the digital data DD stored in the data register 3a-0 to be outputted through the tristate buffer 42 to the data bus DB. At this time, the read signal RD0 is given to the data update flag 3b-0 and the tristate buffer 41, so that the value of the output signal of the data update flag 3b-0 becomes "0". Thereafter, when the read signal RD outputted from the CPU 50 becomes a state which does not specify any channel, the read signal RD0 outputted from the first decoder 61 becomes low level, so that the value of the output signal of the data update flag 3b-0 becomes "0".

Therefore, when the CPU 50 must use the digital data held in the data register 3a-0 of the first channel to perform processing, the first channel is specified by the read signal RD to cause the value held by the data update flag 3b-0 and the digital data DD held by the data register 3a-0 of the first channel to be outputted simultaneously to the data bus DB, so that, in the case where the data processing is performed only when the value of the signal outputted from the data update flag 3b-0 is "1", a wasteful operation that the same data is repeatedly processed will be avoided.

Although in the above-mentioned second embodiment, there is shown a case where both the number of input/output channels into/from the AD converter 1 and the number of the conversion result registers 3 for storing AD conversion results are four, it will be appreciated that a configuration in which the number of the input channels is different from the number of the output channels, as well as a configuration in which the number of the conversion result registers 3 is other than four are of course possible.

[Third embodiment]

Figure 7:
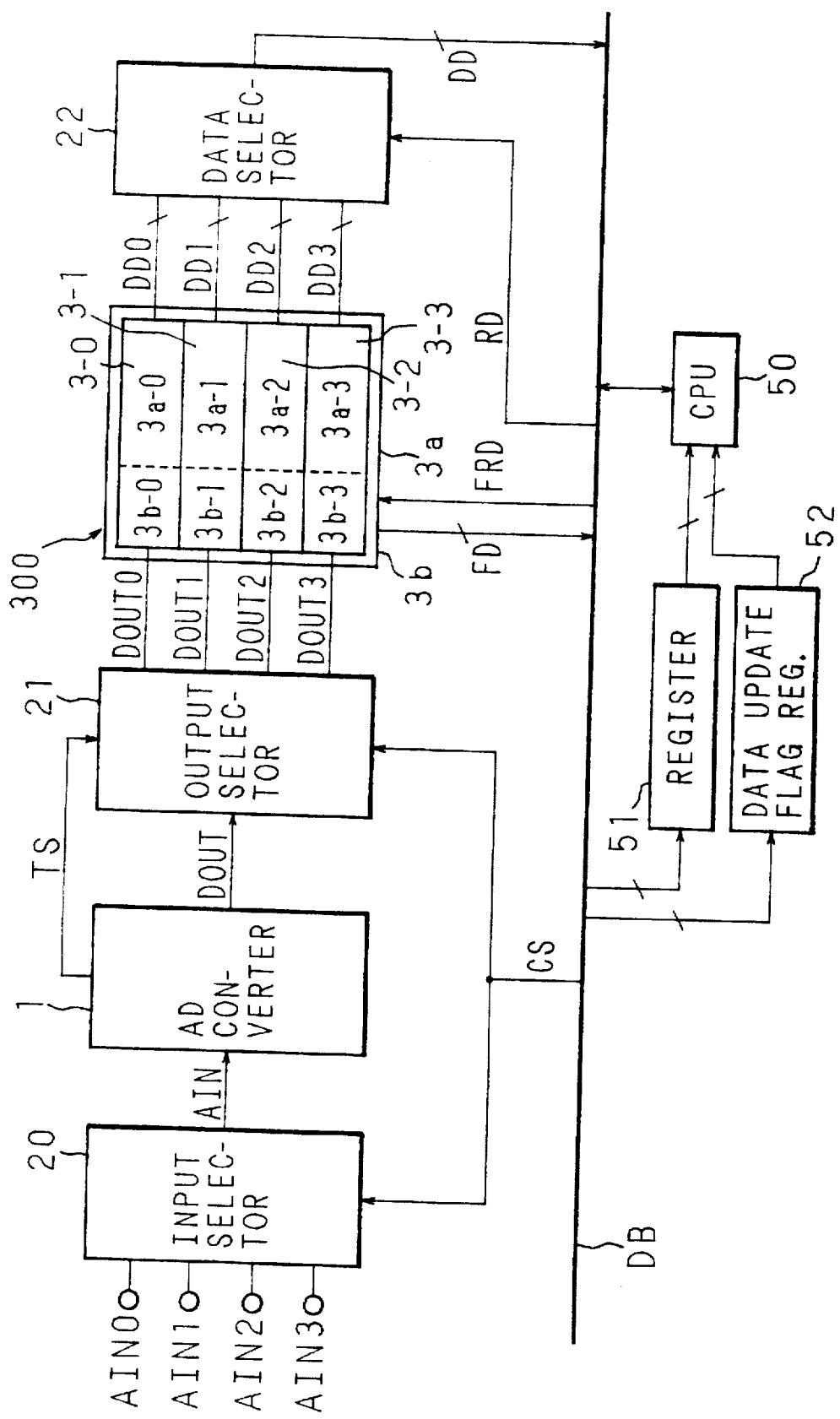
FIG. 7 is a block diagram showing a configuration example of a third embodiment of the AD converting apparatus and the data processor in which the AD converting apparatus is built in related to the present invention.

FIG. 7 is a block diagram showing a configuration example of a third embodiment of the AD converting apparatus and the data processor in which the AD converting apparatus is built in related to the present invention. The above-mentioned second embodiment is configured such that the value of the data update flag 3b and the contents of the data register 3a of each of conversion result registers 3-0, 3-1, 3-2 and 3-3 are read out simultaneously to be held in the register 51. However, the third embodiment is configured such that only the values of the data update flags 3b-0, 3b-1, 3b-2 and 3b-3 of the conversion result register group 300 of the second embodiment are read out simultaneously by the direction from the CPU 50.

In FIG. 7, reference numeral 52 designates a data update flag register which holds the values of the data update flags 3b-0, 3b-1, 3b-2 and 3b-3 of the conversion result register group 300. The values of the data update flags 3b-0, 3b-1, 3b-2 and 3b-3 held in the data update flag register 52 can be read out simultaneously by the CPU 50.

Figure 8:
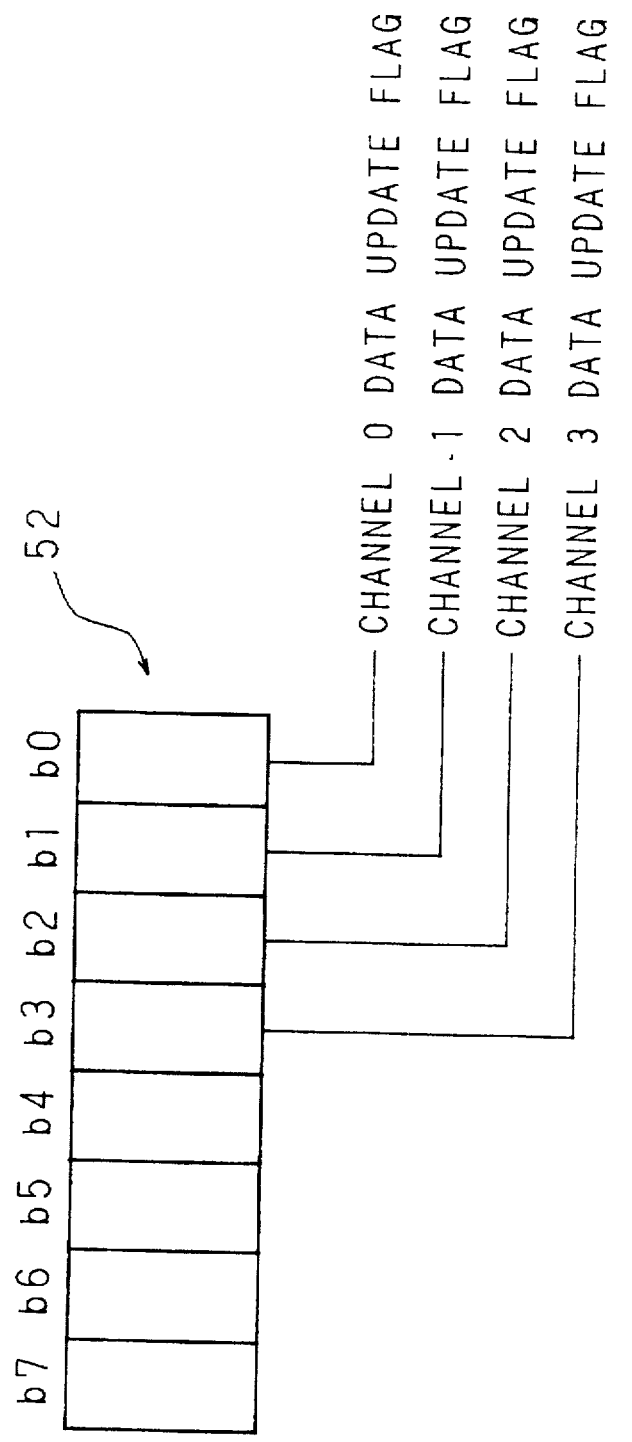
FIG. 8 is a schematic diagram showing a bit configuration example of a data update flag register of the third embodiment.

FIG. 8 is a schematic diagram showing a bit configuration example of the data update flag register 52. In this embodiment, the data update flag register 52 is an eight-bit register composed of bit b0 through bit b7, and four bits from b0 to b3 among them hold respective values of the data update flags 3b-0, 3b-1, 3b-2 and 3b-3.

In FIG. 7, reference character FRD designates a data update flag read signal which is outputted from the CPU 50 in order to read only the value of each of the data update flags 3b-0, 3b-1, 3b-2 and 3b-3 from the conversion result register group 300 so as to be stored into the data update flag register 52.

Figure 9:
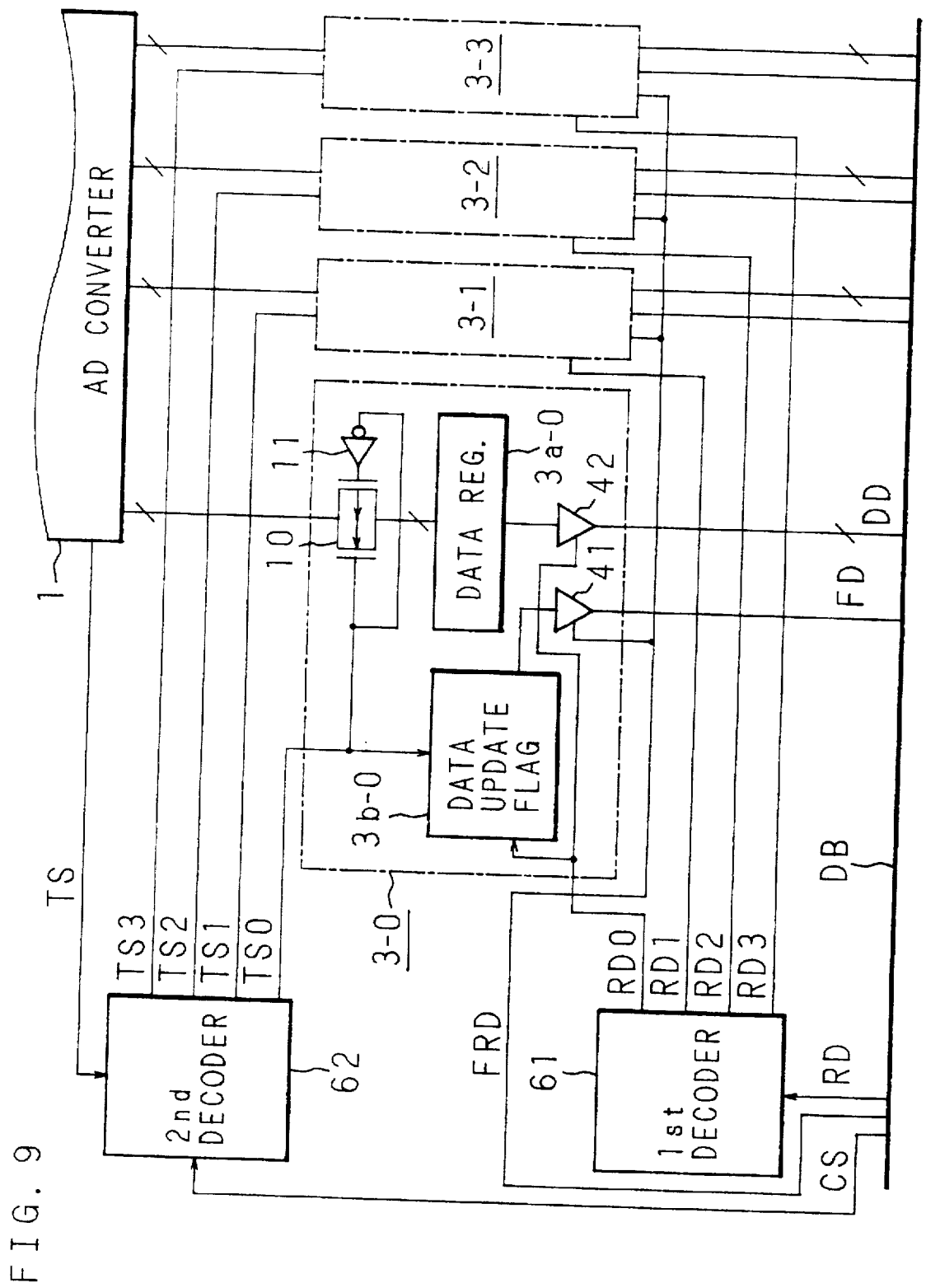
FIG. 9 is a circuit diagram showing a configuration example of a conversion result register group, an output selector and a data selector of the third embodiment.

FIG. 9 is a circuit diagram showing a configuration example of the conversion result register group 300, the output selector 21 and the data selector 22 of this third embodiment. The configuration itself of each of the conversion result registers 3-0, 3-1, 3-2 and 3-3 is not different basically from that of the above-mentioned first embodiment being composed of data register 3a, data update flag 3b, transfer gate 10, inverter 11 and tristate buffers 41 and 42. The internal configuration of each of the data update flags 3b-0, 3b-1, 3b-2 and 3b-3 is also same as that of the data update flag 3b of the first embodiment shown in FIG. 2.

However, in the configuration of the third embodiment shown in FIG. 9, as shown also in FIG. 7, the data update flag read signal FRD is given to the conversion result register group 300. In the second embodiment, the respective tristate buffers 41 of the conversion result registers 3-0, 3-1, 3-2 and 3-3 are on/off controlled by the read signals RD0, RD1, RD2 and RD3 outputted from the first decoder 61, while in this third embodiment, they are on/off controlled simultaneously by the data update flag read signal FRD.

Therefore, when the data update flag read signal FRD of high level is outputted from the CPU 50, the tristate buffers 41 of the conversion result registers 3-0, 3-1, 3-2 and 3-3 in the conversion result register group 300 become simultaneously an on state to cause the values of the respective data update flags 3b-0, 3b-1, 3b-2 and 3b-3 to be outputted to the data bus DB, and as shown in FIG. 7, and held in respective bits b0, b1, b2 and b3 of the above-mentioned data update flag register 52.

By reading out the value thus held in the bits b0, b1, b2 and b3 of the data update flag register 52, the CPU 50 can judge easily whether the contents of any data register 3a, that is, the AD conversion result of any channel is not used. Therefore, when the CPU 50 uses, for example, the AD conversion results of plural channels to perform an arithmetic operation, the values of all the data registers 3a in the conversion result register group 300 can be read out by one operation, thereby enabling processing time to be shortened.

Then, when the CPU 50 outputs the read signal RD specifying a necessary channel, that is, necessary data register 3a in accordance with the contents of the data update flag register 52, the CPU 50 will be able to read the digital data DD in the same way as the previously-mentioned second embodiment.

Although in the above-mentioned third embodiment, in the same way as the previously-mentioned second embodiment, there is shown a case where both the number of input/output channels into/from the AD converter 1 and the number of the conversion result registers 3 for storing AD conversion results are four, it will be appreciated that a configuration in which the number of the input channels is different from the number of the output channels, as well as a configuration in which the number of the conversion result registers 3 is other than four are of course possible.

[Fourth embodiment]

Figure 10:
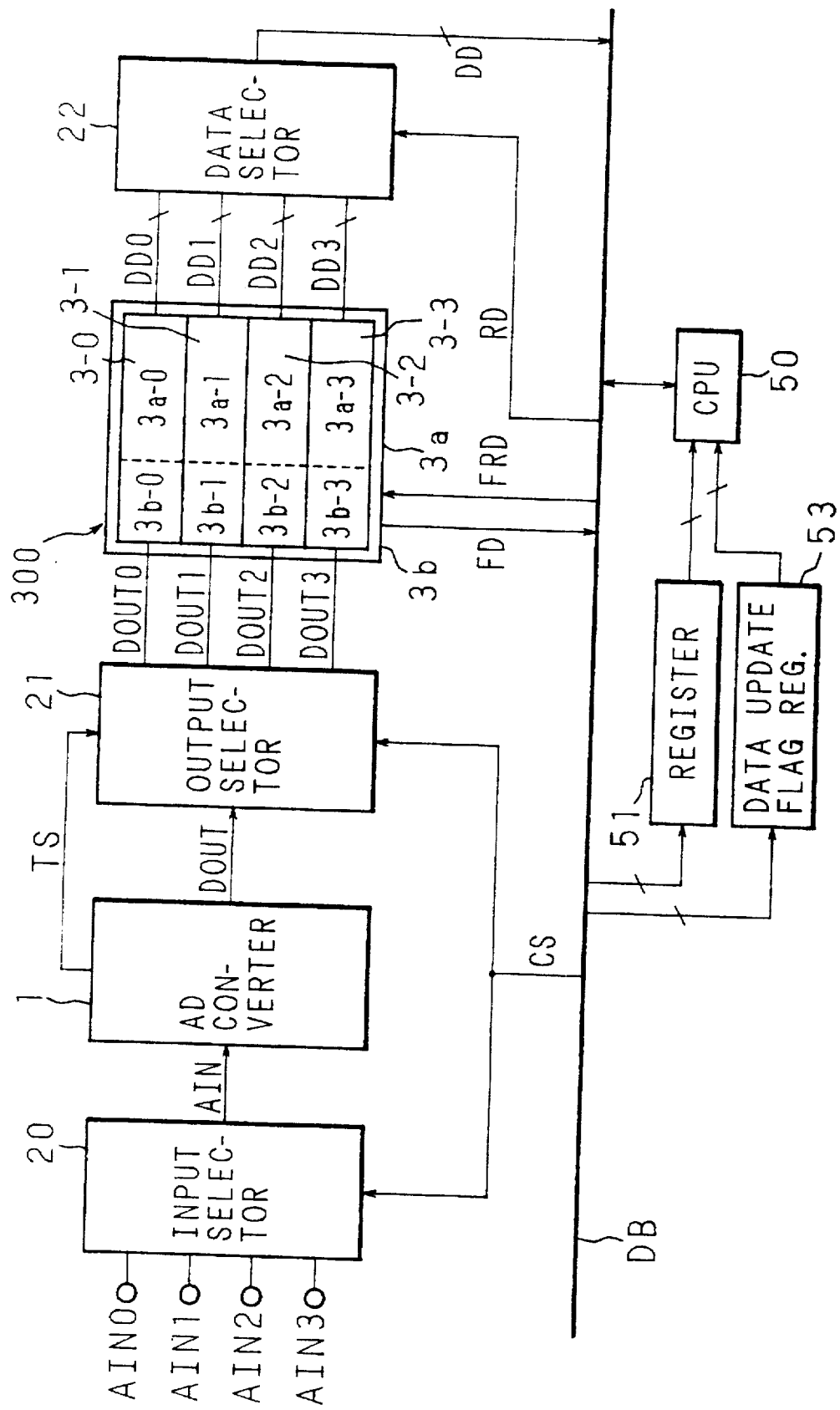
FIG. 10 is a block diagram showing a configuration example of a fourth embodiment of the AD converting apparatus and the data processor in which the AD converting apparatus is built in related to the present invention.

FIG. 10 is a block diagram showing a configuration example of a fourth embodiment of the AD converting apparatus and the data processor in which the AD converting apparatus is built in related to the present invention. The above-mentioned third embodiment is configured such that the values of all the data update flags 3b-0, 3b-1, 3b-2 and 3b-3 of the conversion result register group 300 are read simultaneously by the direction from the CPU 50, while this fourth embodiment is configured such that the values of the data update flags 3b-0, 3b-1, 3b-2 and 3b-3 are logical-summed and then read out by the direction from the CPU 50.

In FIG. 10, reference numeral 53 designates a data update flag register which holds a logical sum of the values of the data update flags 3b-0, 3b-1, 3b-2 and 3b-3 of the conversion result register group 300. The value held in the data update flag register 53 can be read out by the CPU 50.

Figure 11:
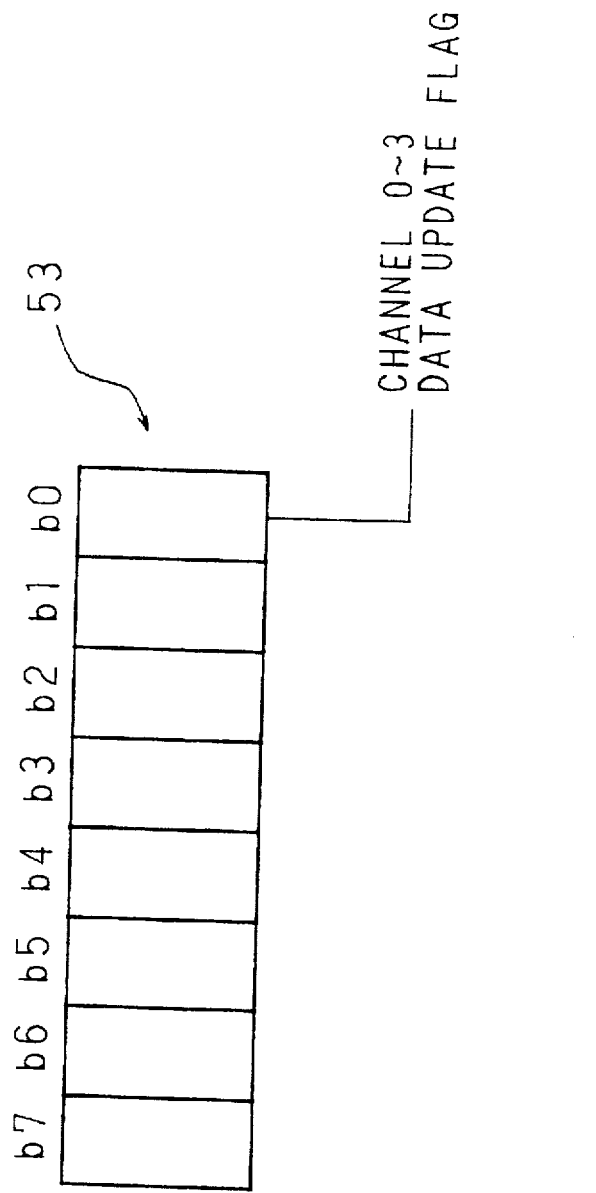
FIG. 11 is a schematic diagram showing a bit configuration example of a data update flag register of the fourth embodiment.

FIG. 11 is a schematic diagram showing a bit configuration example of the data update flag register 53. The data update flag register 53 in this embodiment is an eight-bit register composed of bit b0 through bit b7, and one bit b0 among them holds the logical sum of the values of the data update flags 3b-0, 3b-1, 3b-2 and 3b-3.

In FIG. 10, reference character FRD designates a data update flag read signal which is outputted from the CPU 50 in order to read out the logical sum of the values of the data update flags 3b-0, 3b-1, 3b-2 and 3b-3 from the conversion result register group 300 so as to be stored into the data update flag register 53.

Figure 12:
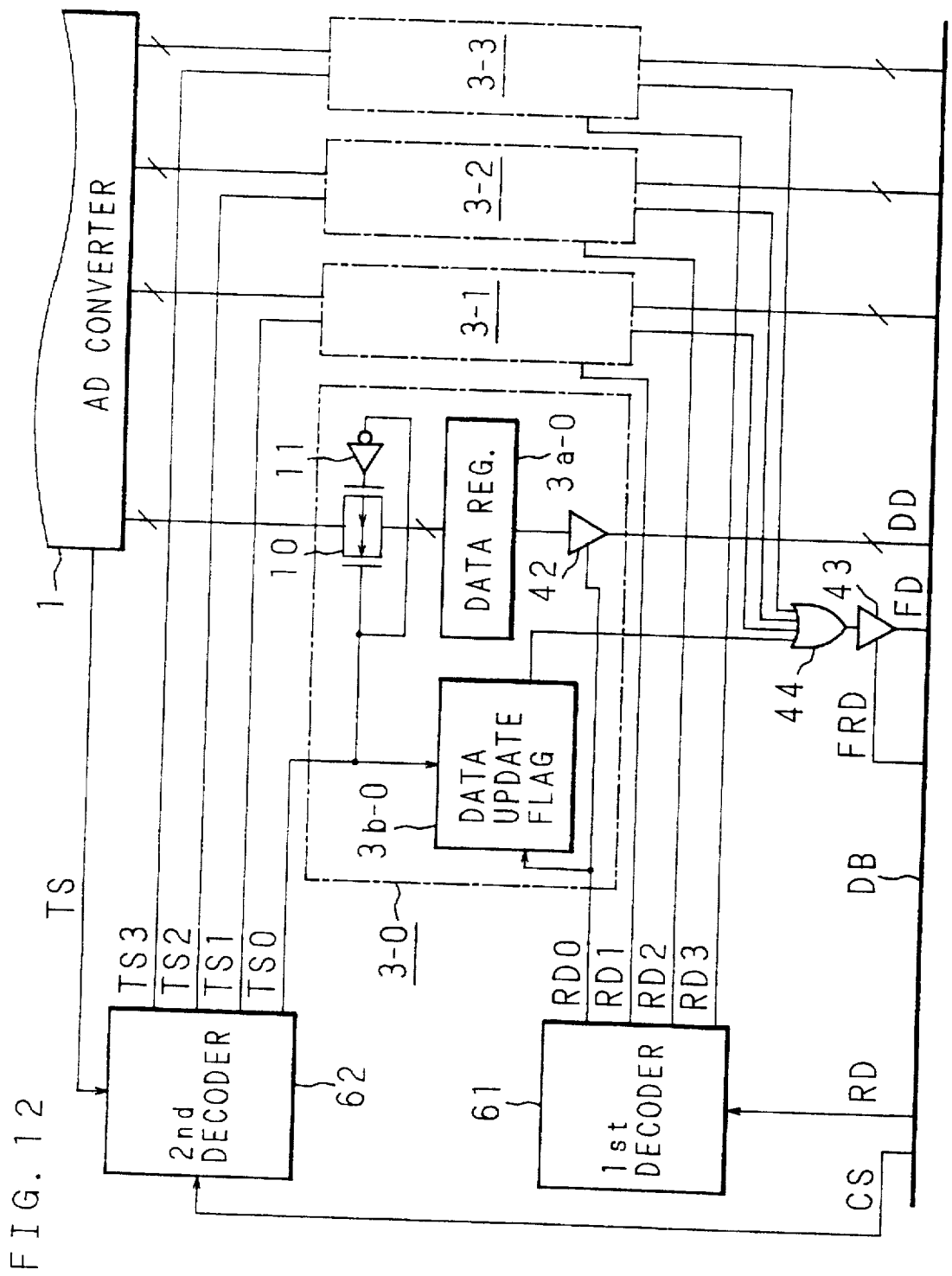
FIG. 12 is a circuit diagram showing a configuration example of a conversion result register group, an output selector and a data selector of the fourth embodiment.

FIG. 12 is a circuit diagram showing a configuration example of the conversion result register group 300, the output selector 21 and the data selector 22 of this fourth embodiment. The configuration itself of each of the conversion result registers 3-0, 3-1, 3-2 and 3-3 is basically same as in the case of the previously-mentioned third embodiment, except that in this fourth embodiment, the tristate buffer 41 is not provided. That is, each of the conversion result registers 3-0, 3-1, 3-2 and 3-3 is composed of data register 3a, data update flag 3b, transfer gate 10, inverter 11 and tristate buffer 42, and the output signal of each of the data update flags 3b-0, 3b-1, 3b-2 and 3b-3 is inputted into an OR gate 44 having four inputs. The internal configuration of each of the data update flags 3b-0, 3b-1, 3b-2 and 3b-3 are also same as that of the data update flag 3b of the previously-mentioned embodiments.

The OR gate 44 inputs the values of the data update flags 3b-0, 3b-1, 3b-2 and 3b-3 of the respective conversion result registers 3-0, 3-1, 3-2 and 3-3 and outputs the logical sum thereof. The output signal of the OR gate 44 is connected through a tristate buffer 45 to the data bus DB. The tristate buffer 45 is on/off controlled by the data update flag read signal FRD.

Therefore, when the data update flag read signal FRD of high level is outputted from the CPU 50, the tristate buffers 41 of the conversion result registers 3-0, 3-1, 3-2 and 3-3 in the conversion result register group 300 become simultaneously in an on state to cause the values of the respective data update flags 3b-0, 3b-1, 3b-2 and 3b-3 to be outputted to the data bus DB, and as shown in FIG. 10, held in respective bits b0, b1, b2 and b3 of the above-mentioned data update flag register 53.

The value thus held in the bit b0 of the data update flag register 53 is read out, thereby allowing the CPU 50 to judge easily whether the contents of any data register 3a, that is, the AD conversion result of any channel is not used or that of all channels has been used. Therefore, by the use of the so-called conditional branch instruction which is included in a general instruction set of the data processor and by which whether branching is performed or not is determined according to the data value of a certain bit, the CPU 50 can perform the processing on whether AD conversion result is read or not according to the value of the data update flag register 53. This causes the number of instructions required for reading the AD conversion result by the CPU 50 to be reduced and thus processing speed to be improved.

Although in the above-mentioned fourth embodiment, in the same way as the previously-mentioned second and third embodiments, there is shown a case where both the number of input/output channels into/from the AD converter 1 and the number of the conversion result registers 3 for storing AD conversion results are four, it will be appreciated that a configuration in which the number of the input channels is different from the number of the output channels, as well as a configuration in which the number of the conversion result registers 3 is other than four are of course possible.

[Fifth embodiment]

Figure 13:
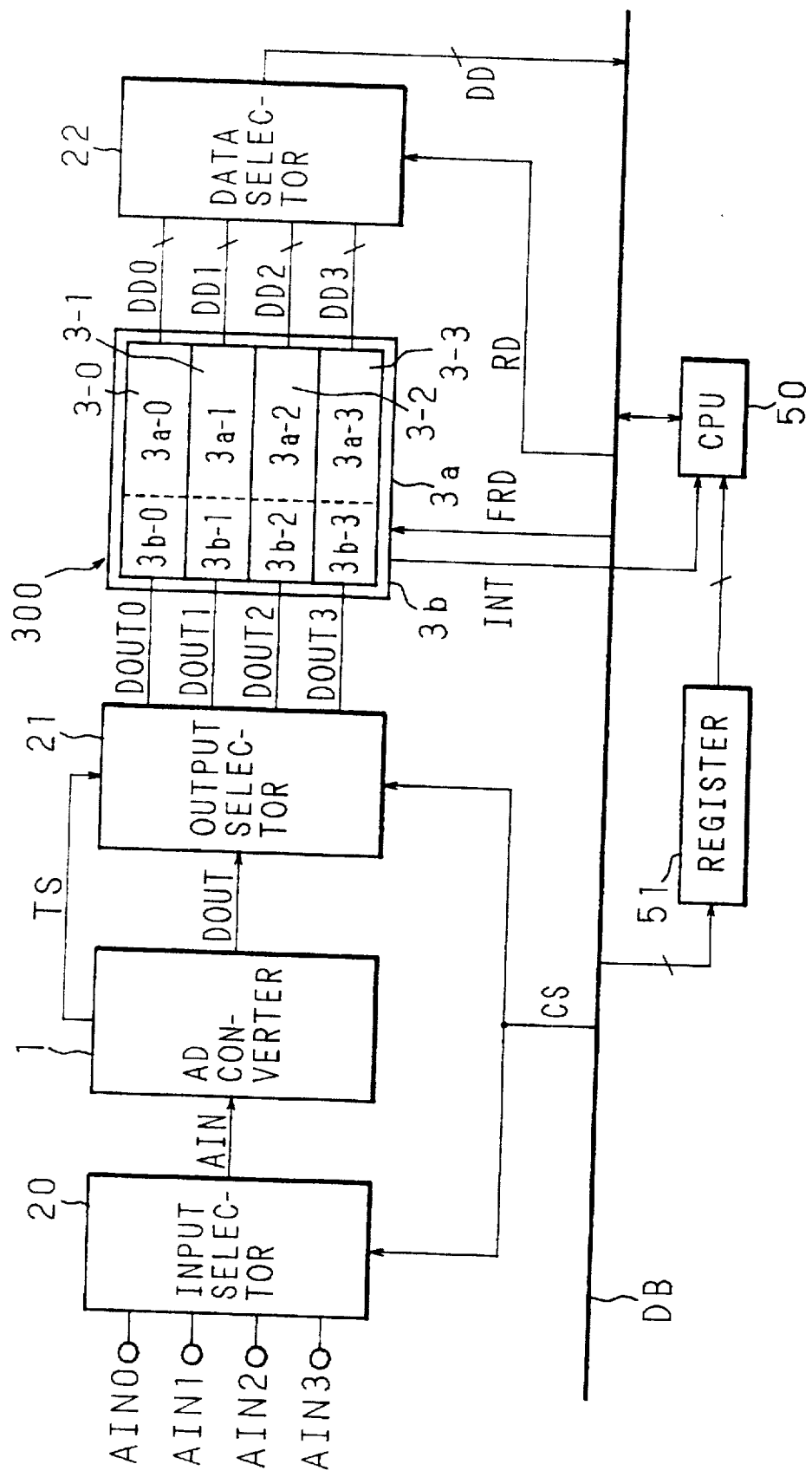
FIG. 13 is a block diagram showing a configuration example of a fifth embodiment of the AD converting apparatus and the data processor in which the AD converting apparatus is built in related to the present invention.
Figure 14:
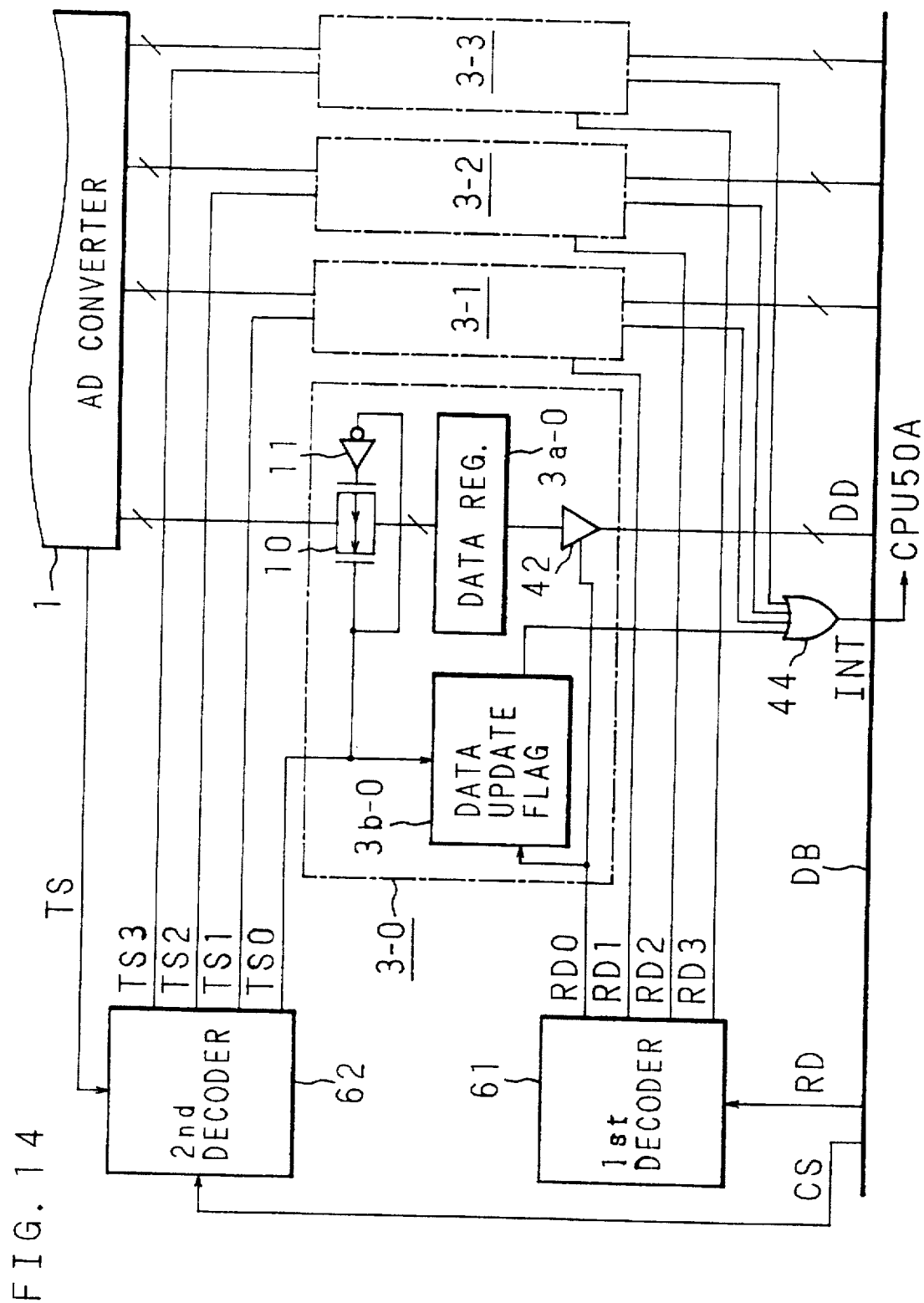
FIG. 14 is a circuit diagram showing a configuration example of a conversion result register group, an output selector and a data selector of the fifth embodiment.

FIG. 13 is a block diagram showing a configuration example of a fifth embodiment of the AD converting apparatus and the data processor in which the AD converting apparatus is built in related to the present invention, and FIG. 14 is a circuit diagram showing a configuration example of the conversion result register group 300, the output selector 21 and the data selector 22 thereof.

The above-mentioned fourth embodiment is configured such that the values of the data update flags 3b-0, 3b-1, 3b-2 and 3b-3 are logical-summed and then read out by the direction from the CPU 50, while this fifth embodiment is configured such that the logical sum of the values of the data update flags 3b-0, 3b-1, 3b-2 and 3b-3 of the conversion result register group 300 is utilized as an interrupt request signal for the CPU 50.

While the above-mentioned fourth embodiment is configured such that the CPU 50 reads the output signal of the OR gate 44 by the use of the tristate buffer 45 controlled by the data update flag read signal FRD, this fifth embodiment shown in FIG. 14 is configured such that the output signal of the OR gate 44 is given, as an interrupt request signal INT, intact to the CPU 50.

Therefore, when at least one of the values of the data update flags 3b-0, 3b-1, 3b-2 and 3b-3 in the conversion result register group 300 is "1", an interrupt request signal INT of high level is to be outputted from the OR gate 44, so that according to the output, the CPU 50 is sufficient for performing an interrupt processing to read AD conversion data. When the CPU 50 uses all the AD conversion data by performing a general processing rather than the interrupt processing, the values of all of the data update flags 3b-0, 3b-1, 3b-2 and 3b-3 become "0" and thus the interrupt request signal INT which is the output signal from the OR gate 44 also becomes "0", so that the interrupt processing by the CPU 50 becomes unnecessary.

Although in the above-mentioned fifth embodiment, in the same way as the previously-mentioned second, third and fourth embodiments, there is shown a case where both the number of input/output channels into/from the AD converter 1 and the number of the conversion result registers 3 for storing AD conversion results are four, it will be appreciated that a configuration in which the number of the input channels is different from the number of the output channels, as well as a configuration in which the number of the conversion result registers 3 is other than four are of course possible.

[Sixth embodiment]

Figure 15:
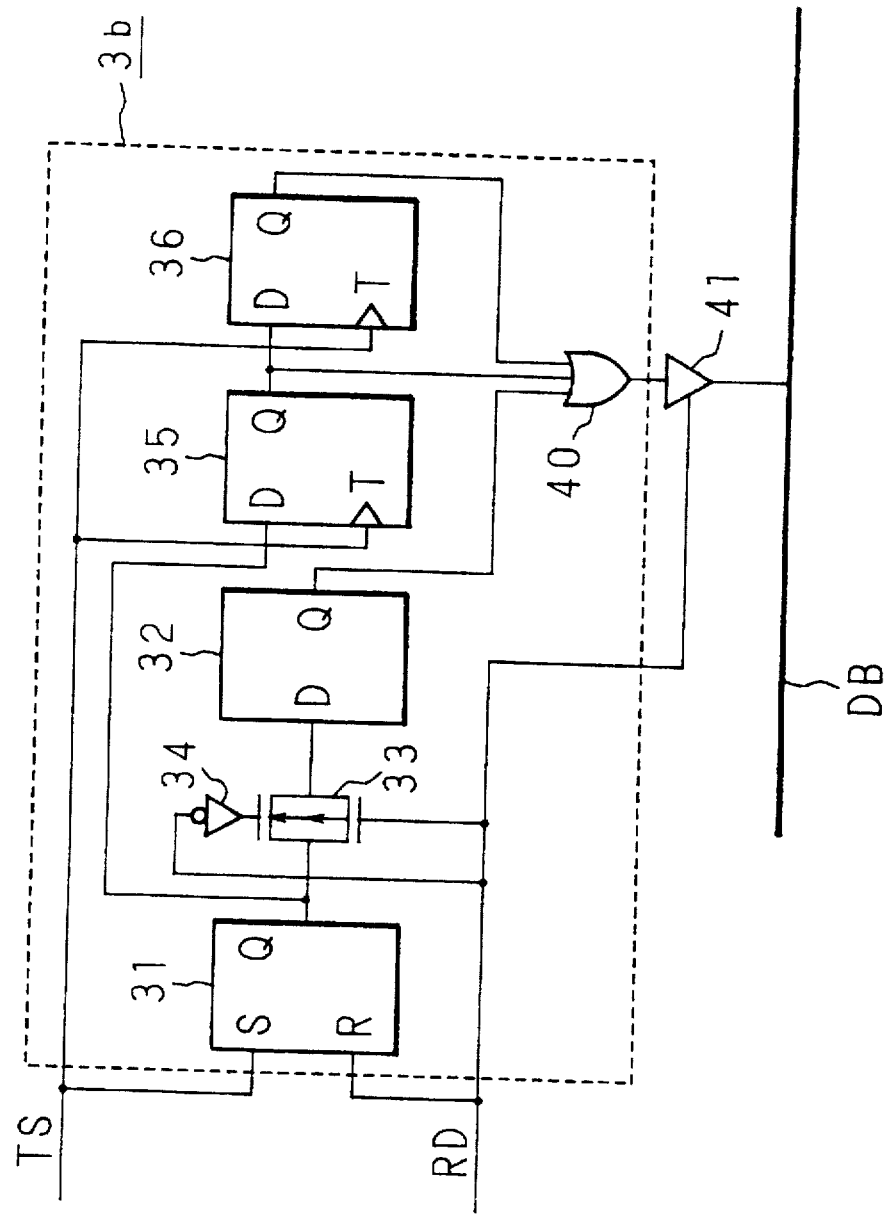
FIG. 15 is a block diagram showing a configuration example of a data update flag as a sixth embodiment of the AD converting apparatus and the data processor in which the AD converting apparatus is built in related to the present invention.

FIG. 15 is a block diagram showing a configuration example of a data update flag as a sixth embodiment of the AD converting apparatus and the data processor in which the AD converting apparatus is built in related to the present invention.

While in the above-mentioned embodiments, the data update flag of the conversion result register is configured as a one-bit flag, in this sixth embodiment, it is configured as a three-bit shift register as an example.

Specifically, the data update flag 3b of this embodiment is provided with a data latch 35 for latching the output signal of the SR flip-flop 31 of the data update flags in the above-mentioned embodiments in synchronism with the conversion result transfer signal TS, and with a data latch 36 for further latching the output signal of the data latch 35 in synchronism with the conversion result transfer signal TS. The data update flag 3b is configured such that it is provided with an OR gate 40 for logical-summing the output signals of the data latch 32, the data latch 35 and the data latch 36, and that the output signal of the OR gate 40 is connected through the tristate buffer 41 on/off controlled by the read signal RD to the data bus DB.

The configuration of the sixth embodiment as shown in FIG. 15 is similar with respect to the output signal of the data latch 32 to the data update flag of the previously-mentioned first embodiment shown in FIG. 2. In addition, every time the conversion result transfer signal TS rises from low level to high level, that is, every time the AD converter 1 performs AD conversion, the output signal of the SR flip-flop 31 is latched by the data latch 35, and the output signal of the data latch 35 is latched by the data latch 36. Then, the output signals of these data latches 32, 35, 36 are logical-summed by the OR gate 40 and then outputted from the tristate buffer 41 to the data bus DB.

Therefore, when there is provided such data update flag 3b functioning as a three-stage shift register of this sixth embodiment, it is convenient, for example, in a case where three digital data are processed to obtain an average. That is, when the CPU 50 reads continuously three times the digital data of AD conversion results of a certain channel from the conversion result register 3, the output signal of the data update flag 3b of the conversion result register 3 becomes "0", so that the CPU 50 is sufficient at this time for performing the processing of the previously-read three digital data to obtain an average.

Although in the above-mentioned sixth embodiment, there is shown an example in which the data update flag 3b is configured as a three-step shift register, it will be appreciated that the data register may be cascade-connected so as to be configured in the number of steps other than that number.

According to the AD converting apparatus and the data processor in which the AD converting apparatus is built in related to the present invention, the value of the data update flag indicates whether the data stored in the data register has been used or not, so that a wasteful processing by the CPU can be avoided.

Also, according to the AD converting apparatus and the data processor in which the AD converting apparatus is built in related to the present invention, the digital data obtained by AD converting the analog signals of plural channels can be stored into respective plural data registers.

Also, according to the AD converting apparatus and the data processor in which the AD converting apparatus is built in related to the present invention, because the data register and the data update flag are configured as one register, they can be accessed with one operation.

Also, according to the AD converting apparatus and the data processor in which the AD converting apparatus is built in related to the present invention, only the values stored in a plurality of the data update flags can be read first, and utilized for data processing at need.

Also, according to the AD converting apparatus and the data processor in which the AD converting apparatus is built in related to the present invention, the value of logical sum signals indicate whether any of data of AD conversion result has been used, or whether every data has not been used, so that it can be utilized for data processing at need.

Also, according to the AD converting apparatus and the data processor in which the AD converting apparatus is built in related to the present invention, the usage history of the data obtained as a result of plural AD conversions is indicated, so that it can be utilized for data processing at need.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. An AD converting apparatus, comprising:
   an AD converter for converting an analog signal to digital data; and
   data storing means for storing the digital data obtained by said AD converter; and
   further comprising holding means for holding a first value when an analog signal is newly converted by said AD converter to digital data and is stored into said data storing means, and for holding a second value when the contents of said data storing means are read out externally in a state under which said first value has been stored therein.

2. The AD converting apparatus as set forth in claim 1, wherein said data storing means and said holding means are configured as one register.

3. The AD converting apparatus as set forth in claim 1, wherein said holding means are configured as a shift register for performing shift operation when an analog signal is newly converted by said AD converter to digital data and is stored into said register.

4. The AD converting apparatus as set forth in claim 1, wherein at least a plurality of said data storing means are provided, and in correspondence with respective said data storing means, said holding means are provided.

5. The AD converting apparatus as set forth in claim 4, wherein said data storing means and said holding means are configured as one register.

6. The AD converting apparatus as set forth in claim 4, further comprising means for simultaneously reading out values stored in said plural holding means as a parallel signal.

7. The AD converting apparatus as set forth in claim 4, further comprising means for outputting logical sum signal of the values stored in said plural holding means.

8. The AD converting apparatus as set forth in claim 4, wherein said holding means are configured as a shift register for performing shift operation when an analog signal is newly converted by said AD converter to digital data and is stored into said register.

9. A data processor, comprising:
   an AD converter for converting an analog signal to digital data;
   data storing means for storing the digital data obtained by said AD converter; and
   a CPU for utilizing the digital data stored in said data storing means to perform data processing; and
   further comprising holding means for holding a first value when an analog signal is newly converted by said AD converter to digital data and is stored into said data storing means, and for holding a second value when the contents of said data storing means are read out by said CPU in a state under which said first value has been stored therein.

10. The microprocessor as set forth in claim 9, wherein said data storing means and said holding means are configured as one register accessible by said CPU.

11. The microprocessor as set forth in claim 9, wherein said holding means are configured as a shift register for performing shift operation when an analog signal is newly converted by said AD converter to digital data and is stored into said register.

12. The microprocessor as set forth in claim 9, wherein at least a plurality of said data storing means are provided, and in correspondence with respective said data storing means, said holding means are provided, and
   further comprising selecting means for selecting any of said data storing means according to the direction of said CPU, and for storing the digital data obtained by said AD converter into the selected data storing means.

13. The microprocessor as set forth in claim 12, wherein said data storing means and said holding means are configured as one register accessible by said CPU.

14. The microprocessor as set forth in claim 12, further comprising means for simultaneously reading out values stored in said plural holding means as a parallel signal in accordance with the direction of said CPU.

15. The microprocessor as set forth in claim 12, further comprising means for outputting logical sum signal of the values stored in said plural holding means.

16. The microprocessor as set forth in claim 15, wherein said logical sum signal is given to said CPU as an interrupt request signal.

17. The microprocessor as set forth in claim 12, wherein said holding means are configured as a shift register for performing shift operation when an analog signal is newly converted by said AD converter to digital data and is stored into said register.

18. The AD converting apparatus as set forth in claim 1, further comprising:
   a read signal line for providing a read signal at a first level when the contents of the data storing means are read out externally, and
   a first transfer gate connected between the AD converter and the data storage means, wherein
   the AD converter is configured to output a transfer signal at the first level every time an analog signal is converted to digital data,
   the first transfer gate is configured to transfer said digital data from the AD converter to the data storing means in response to the transfer signal at the first level, and the holding means comprises a SR flip-flop having a set input connected to receive the transfer signal from the AD converter, a reset input connected to the read signal line, and an output, a signal at the output of the SR flip-flop is set to the first level in response to the transfer signal at the first level and reset to a second level in response to the read signal on the read signal line at the first level when the contents of the data storing means are read out externally, a data latch configured to receive and latch the output from the SR flip-flop, and a second transfer gate connected between the output of the SR flip-flop and the data latch, said second transfer gate is configured to transfer the signal at the output of the SR flip-flop to the data latch in response to the read signal provided on the read signal line being at the second level and to block transfer of the signal at the output of the SR flip-flop to the data latch in response to the read signal being at the first level.

19. The AD converting apparatus as set forth in claim 9, further comprising:

a read signal line for providing a read signal at a first level when the contents of the data storing means are read out externally, and a first transfer gate connected between the AD converter and the data storage means, wherein the AD converter is configured to output a transfer signal at the first level every time an analog signal is converted to digital data, the first transfer sate is configured to transfer said digital data from the AD converter to the data storing means in response to the transfer signal at the first level, and the holding means comprises a SR flip-flop having a set input connected to receive the transfer signal from the AD converter, a reset input connected to the read signal line, and an output, a signal at the output of the SR flip-flop is set to the first level in response to the transfer signal at the first level and reset to a second level in response to the read signal on the read signal line at the first level when the contents of the data storing means are read out externally, a data latch configured to receive and latch the output from the SR flip-flop, and a second transfer sate connected between the output of the SR flip-flop and the data latch, said second transfer gate is configured to transfer the signal at the output of the SR flip-flop to the data latch in response to the read signal provided on the read signal line being at the second level and to block transfer of the signal at the output of the SR flip-flop to the data latch in response to the read signal being at the first level.

* * * * *

UNITED STATES PATENT AND TRADEMARK OFFICE
CERTIFICATE OF CORRECTION

PATENT NO. : 5,748,984
DATED : May 5, 1998
INVENTOR(S) : Mitsuru SUGITA

It is certified that error appears in the above-indentified patent and that said Letters Patent is hereby corrected as shown below:

On the title page, item [30] should read as follows:

--[30]   Foreign Application Priority Data

Sep. 5, 1994    [JP] Japan   ..............6-211250--

Signed and Sealed this

Fourth Day of August, 1998

*Attest:*

BRUCE LEHMAN

*Attesting Officer*       *Commissioner of Patents and Trademarks*